United States Patent
Maziewski et al.

(10) Patent No.: US 10,165,362 B2
(45) Date of Patent: Dec. 25, 2018

(54) AUTOMATED EQUALIZATION

(71) Applicant: Intel Corporation, Santa Clara, CA (US)

(72) Inventors: Przemyslaw Maziewski, Gdansk (PL); Michal Borwanski, Gdynia (PL)

(73) Assignee: Intel Corporation, Santa Clara, CA (US)

(*) Notice: Subject to any disclaimer, the term of this patent is extended or adjusted under 35 U.S.C. 154(b) by 144 days.

(21) Appl. No.: 14/757,884

(22) Filed: Dec. 24, 2015

(65) Prior Publication Data

US 2017/0188148 A1 Jun. 29, 2017

(51) Int. Cl.
*H04R 3/04* (2006.01)
*H04R 1/08* (2006.01)
*H04R 29/00* (2006.01)
*G10L 15/04* (2013.01)
*G10L 15/02* (2006.01)
*G10L 15/20* (2006.01)
*G10L 21/0316* (2013.01)

(52) U.S. Cl.
CPC ............. *H04R 3/04* (2013.01); *G10L 15/02* (2013.01); *G10L 15/04* (2013.01); *G10L 15/20* (2013.01); *H04R 1/08* (2013.01); *H04R 29/00* (2013.01); *G10L 21/0316* (2013.01)

(58) Field of Classification Search
CPC . G10L 21/0208; G10L 21/0232; G10L 15/20; G10L 2021/02082; G10L 19/06; G10L 25/03; G10L 19/083; G10L 2021/02165; G10L 2021/02166; G10L 2025/783; G10L 21/02; G10L 21/0364

USPC ....... 704/226, 271, 205, 206, 270, 220, 276, 704/275
See application file for complete search history.

(56) References Cited

U.S. PATENT DOCUMENTS

| | | | |
|---|---|---|---|
| 6,993,482 B2* | 1/2006 | Ahlenius | G10L 15/22 704/235 |
| 6,999,924 B2* | 2/2006 | Burnett | A61B 5/0507 704/233 |
| 7,035,795 B2* | 4/2006 | Burnett | A61B 5/0507 704/223 |
| 9,271,074 B2* | 2/2016 | Carvalho de Matos | H04R 5/027 |

(Continued)

FOREIGN PATENT DOCUMENTS

| | | |
|---|---|---|
| WO | 2010117711 A1 | 10/2010 |
| WO | 2015021216 A1 | 2/2015 |

OTHER PUBLICATIONS

PCT International Search Report, PCT Application No. PCT/US2016/057735, dated Feb. 3, 2017, 3 pages.

(Continued)

*Primary Examiner* — Edgar X Guerra-Erazo
(74) *Attorney, Agent, or Firm* — International IP Law Group, P.L.L.C.

(57) ABSTRACT

Techniques for improving speech recognition are described. An example of an electronic device includes an extracting unit to extract a reference spectral profile from a reference signal and a device spectral profile from a device signal. A comparing unit compares the reference spectral profile and the device spectral profile. A delta calculating unit calculates a delta between the reference spectral profile and the device spectral profile. A design unit designs a correction filter based on the computed delta.

22 Claims, 9 Drawing Sheets

(56) References Cited

U.S. PATENT DOCUMENTS

| | | | |
|---|---|---|---|
| 2001/0016815 A1* | 8/2001 | Takahashi | G10L 15/26 704/235 |
| 2004/0242160 A1* | 12/2004 | Ichikawa | H04M 1/585 455/67.13 |
| 2005/0086058 A1 | 4/2005 | Lemelson et al. | |
| 2005/0185813 A1 | 8/2005 | Sinclair et al. | |
| 2008/0288253 A1 | 11/2008 | Arnone et al. | |
| 2010/0049516 A1 | 2/2010 | Talwar et al. | |
| 2012/0188402 A1* | 7/2012 | Guo | H04N 5/2351 348/223.1 |
| 2012/0314086 A1* | 12/2012 | Hubel | H04N 17/002 348/175 |
| 2017/0006399 A1* | 1/2017 | Maziewski | H04R 3/04 |

OTHER PUBLICATIONS

Chlebek et al., Poland PCT Application, PCT No. PCT/PL2015/050074; Filed with the Patent Office of the Republic of Poland on Dec. 22, 2015, Application, Drawings, and E-Ack Receipt attached 41 pages, not yet published.

\* cited by examiner

400A

| WER [%] | Angles | | | | | |
|---|---|---|---|---|---|---|
| | 0 | 15 | 30 | 45 | 60 | Mean |
| No EQ | 2.329 | 2.6 | 2.275 | 2.384 | 2.384 | 2.394 |
| With EQ | 1.571 | 1.95 | 1.842 | 1.788 | 1.95 | 1.820 |
| Delta | 0.758 | 0.65 | 0.433 | 0.596 | 0.434 | 0.574 |

| WER [%] | Angles | | | | | Mean |
|---|---|---|---|---|---|---|
| | 0 | 15 | 30 | 45 | 60 | |
| No EQ | 7.313 | 8.938 | 11.755 | 11.051 | 13.164 | 10.444 |
| With EQ | 5.309 | 7.638 | 7.367 | 8.18 | 7.259 | 7.151 |
| Delta | 2.004 | 1.3 | 4.388 | 2.871 | 5.905 | 3.294 |

AUTOMATED EQUALIZATION

TECHNICAL FIELD

The present disclosure relates generally to techniques for equalization of a microphone internal to a device to improve the accuracy of speech recognition by the device. More specifically, the present techniques relate to the calculation of a correction filter which is applied to a signal produced by the microphone.

BACKGROUND ART

Automatic speech recognition (ASR) systems enable the translation of spoken language into text by a computer or computerized device. The performance of ASR systems varies from one device to another partly because of the differences in the frequency response of the devices' microphones.

BRIEF DESCRIPTION OF THE DRAWINGS

FIG. 4E is an example of accuracy improvements in automatic speech recognition (ASR) resulting from application of a correction filter obtained using the present techniques; and FIG. 4F is an example of accuracy improvements in ASR resulting from application of a correction filter obtained using the present techniques.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The subject matter disclosed herein relates to techniques for improving speech recognition of a computerized device. The present disclosure describes techniques for improving speech recognition by calculating and applying a correction filter. For example, a reference signal may be calculated from a set of speech recordings. A device signal may be obtained by recording a speech utterance. A reference spectral profile may be extracted from the reference signal and a device spectral profile may be extracted from the device signal. The reference spectral profile and the device spectral profile may be compared. A delta between the reference spectral profile and the device spectral profile may be calculated. A correction filter may be designed using the computed delta. The correction filter may be applied to a signal produced by the device's microphone. Correction filters may be designed for different circumstances and for various microphones in multi-microphone devices. Various examples of the present techniques are described further below with reference to the figures.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
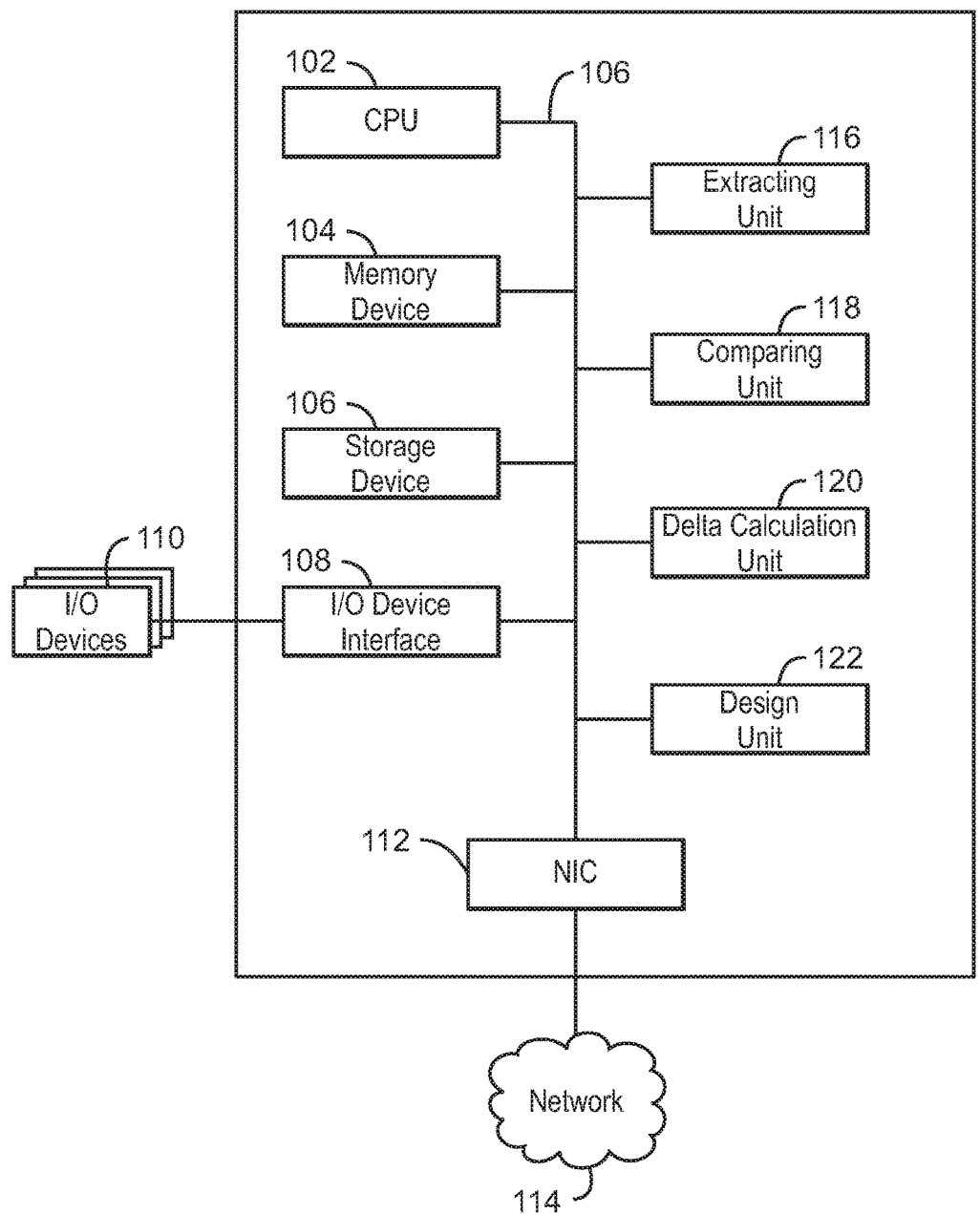
FIG. 1 is a block diagram of an electronic device for improving automatic speech recognition.

FIG. 1 is a block diagram of an electronic device 100 for improving automatic speech recognition. For example, the electronic device 100 may be a desktop computer, laptop computer, tablet computer, mobile phone, smart phone, or any other suitable electronic device. The electronic device 100 may include a central processing unit (CPU) 102 that is configured to execute stored instructions, as well as a memory device 104 that stores instructions that are executable by the CPU 102. The CPU 102 may be coupled to the memory device 104 by a bus 106. The CPU 102 may be a single core processor, a multi-core processor, a computing cluster, or any number of other configurations. The CPU 102 may be implemented as a Complex Instruction Set Computer (CISC) processor, a Reduced Instruction Set Computer (RISC) processor, x86 Instruction set compatible processor, or any other microprocessor or central processing unit. In some embodiments, the CPU 102 includes dual-core processor(s), dual-core mobile processor(s), or the like.

The memory device 104 may include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory system. The memory device 104 can be used to store data and computer-readable instructions that, when executed by the CPU 102, direct the CPU 102 to perform various operations in accordance with embodiments described herein.

The electronic device 100 may also include a storage drive 106. The storage device 106 is a physical memory device such as a hard drive, an optical drive, a flash drive, an array of drives, or any combinations thereof. The storage device 106 may store data such as audio signals and spectral profiles, among other types of data. The storage device 106 may also store programming code such as device drivers, software applications, operating systems, and the like. The programming code stored by the storage device 106 may be executed by the CPU 102 or any other processors that may be included in the electronic device 100.

The electronic device 100 may also include an input/output (I/O) device interface 108 configured to connect the electronic device 100 to one or more I/O devices 110. For example, the I/O devices 110 may include a printer, a scanner, a keyboard, and a pointing device such as a mouse, touchpad, or touchscreen, among others. The I/O devices 110 may be built-in components of the electronic device 100, or may be devices that are externally connected to the electronic device 100.

The electronic device 100 may also include a network interface controller (NIC) 112 configured to connect the electronic device 100 to a network 114. The network 114 may be a wide area network (WAN), local area network (LAN), or the Internet, among others.

The electronic device 100 may be a stand-alone device or a component of a device under test (DUT). The DUT is the device to which the correction filter will be applied.

The electronic device 100 may include a first calculating unit (not shown) to calculate a reference signal from a set of recordings. To obtain a DUT signal, a microphone internal to the DUT may receive a speech utterance. The speech utterance received by the microphone may be converted into an electrical signal containing information that represents the speech utterance. This signal may be the DUT signal. DUT signals may be obtained for different microphones of the DUT, for different orientations of the DUT (e.g., portrait or landscape), different distances from a user to the DUT, and different angles between a user and the DUT. The different DUT signals may be used to construct different correction filters that are applied depending on the DUT microphone used, the DUT's orientation, and a user's position relative to the DUT. A recording unit (not shown) may record the various DUT signals. In some embodiments, the DUT itself may record the speech utterances.

The electronic device 100 may also include an extracting unit 116 to extract a reference spectral profile from the reference signal and a DUT spectral profile from the DUT signal. A comparing unit 118 may compare the reference spectral profile and the DUT spectral profile. A delta calculating unit 120 may calculate a delta between the two spectral profiles. The computed delta may serve as a basis for the design of the correction filter by the design unit 122. An application unit (not shown) may apply the correction filter to the signal emanating from the DUT's microphone.

Different correction filters may be applied depending on the DUT microphone used, the DUT's orientation, and the user's position relative to the DUT. An orientation sensor (not shown) may determine the orientation of the DUT and apply the appropriate correction filter. For example, if a user is speaking and the DUT is in portrait mode, the applied correction filter may be the filter constructed from the DUT signal received while the DUT had a portrait orientation. In another example, different correction filters may be applied depending on whether the lid of the DUT (e.g., a laptop) was open or closed when the user was speaking.

The electronic device 100 may also include a proximity sensor (not shown) to determine the distance from a speaker to the DUT and apply the appropriate correction filter. For example, if the speaker is two feet from the DUT, the applied correction filter may be the filter constructed from the DUT signal received from two feet away.

The electronic device 100 may include an angle sensor (not shown) to determine the angle between a speaker and the DUT and apply the appropriate correction filter. For example, if the speaker is at an angle of 30° to the DUT, the applied correction filter may be the filter constructed from the DUT signal received at an angle of 30°. In this way, the orientation sensor, proximity sensor, and angle sensor may determine the correction filter that is applied to the signal propagating from the DUT's microphone.

Communication between various components of the electronic device 100 may be accomplished via one or more busses 106. At least one of the busses 106 may be a D-PHY bus, a Mobile Industry Processor Interface (MIPI) D-PHY bus, or an M-PHY bus, or any other suitable bus.

The bus architecture shown in FIG. 1 is just one example of a bus architecture that may be used with the techniques disclosed herein. In some examples, the bus 106 may be a single bus that couples all of the components of the electronic device 100 according to a particular communication protocol. Furthermore, the electronic device 100 may also include any suitable number of busses 106 of varying types, which may use different communication protocols to couple specific components of the electronic device according to the design considerations of a particular implementation.

The block diagram of FIG. 1 is not intended to indicate that the computing device 100 is to include all of the components shown in FIG. 1. Rather, the computing system 100 can include fewer or additional components not shown in FIG. 1, depending on the details of the specific implementation. Furthermore, any of the functionalities of the CPU 102 may be partially, or entirely, implemented in hardware and/or by a processor. For example, the functionality may be implemented in any combination of Application Specific Integrated Circuits (ASICs), Field Programmable Gate Arrays (FPGAs), logic circuits, and the like. In addition, embodiments of the present techniques can be implemented in any suitable electronic device, including ultra-compact form factor devices, such as System-On-a-Chip (SOC), and multi-chip modules.

Figure 2:
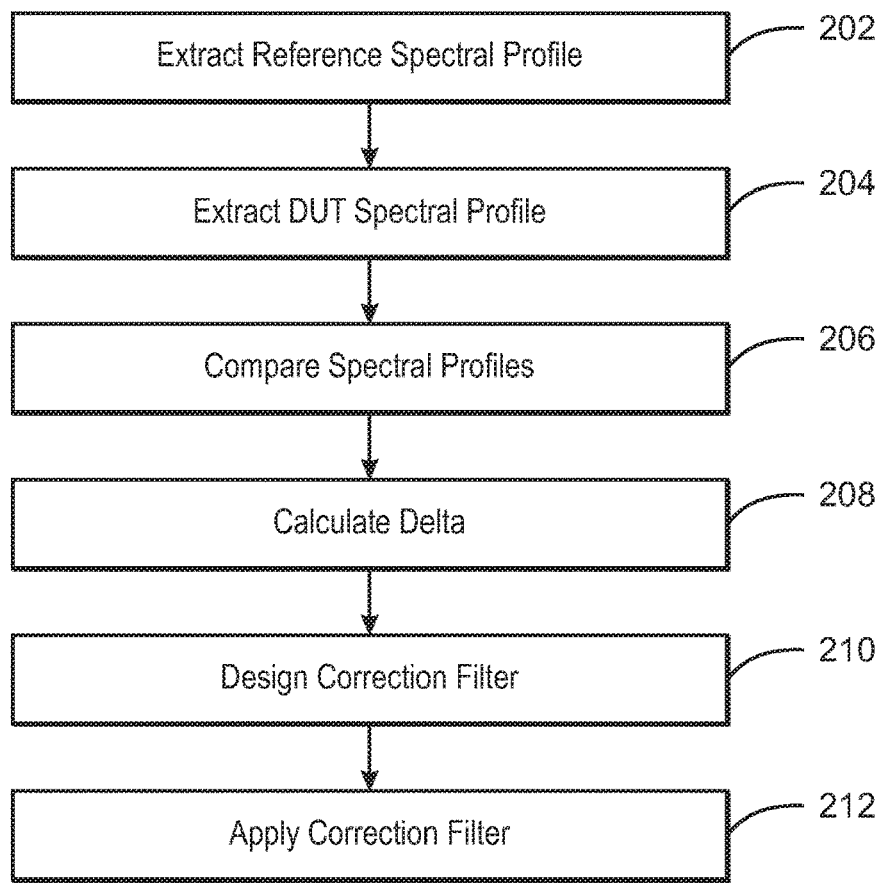
FIG. 2 is a process flow diagram of a method for improving automatic speech recognition.

FIG. 2 is a process flow diagram of a method 200 for improving automatic speech recognition. The method 200 may be performed by the electronic device 100 shown in FIG. 1. The method 200 may begin by obtaining a reference signal and a DUT signal (not shown). The reference signal may be computed using a set of speech recordings. The speech recordings may have a high accuracy, i.e., low word error rate, when used with a particular automatic speech recognition (ASR) system. Different speech recordings may be obtained using different ASR systems. The different speech recordings may be used to construct correction filters applicable to specific ASR systems. For example, if a speech recording is obtained using a particular ASR system, the correction filter may be used with that particular system. Suitable ASR systems are available from a number of manufacturers and/or organizations.

The DUT signal may be constructed in a series of steps. A speech utterance may be recorded using the DUT to obtain a recorded speech utterance. The speech utterance may be recorded under different circumstances, i.e., different orientations of the DUT and different positions of the speaker relative to the DUT. The circumstances under which the recording was made may determine the circumstances under which the correction filter will be applicable. For example, if the recording was obtained when the DUT was in landscape mode and the speaker was 3 feet away from the DUT at an angle of 45° to the DUT, the resulting correction filter may be applied under the same circumstances. In other examples, the correction filter may have an average spectral profile obtained from recordings made while one condition is held constant (e.g., portrait or landscape mode) and the other conditions are varied.

The recorded speech utterance may be broadcast using a speaker external to the DUT to obtain a broadcasted speech utterance. The broadcasted speech utterance may be received via a microphone or microphones internal to the DUT. Once received by the microphone, the broadcasted speech utterance may become a DUT signal.

The method 200 may include blocks 202-212. At block 202, a reference spectral profile may be extracted from the reference signal by the extracting unit 116. The amplitude spectra of the reference signal may be time averaged to yield an averaged reference amplitude spectrum. The averaged reference amplitude spectrum constitutes the reference spectral profile. For example, the reference spectral profile may be computed as an average of short time amplitude spectra of the reference signal. Short time magnitude spectra may also be averaged. The average may be calculated across adjacent time frames of the reference signal. Each time frame may be converted to the frequency domain by the fast Fourier transform (FFT), the cosine transform, and the like. The resolution of the spectral profile may be selected to match the Mel-filtering resolution defined in the ETSI ES 201 108 standard, "Speech Processing, Transmission and Quality Aspects." The standard describes a distributed speech recognition system that overcomes the degradation of the performance of speech recognition systems receiving speech transmitted over mobile channels. Matching of the spectral resolution to the Mel-filtering resolution may be performed because Mel filters are typically used to analyze signals in ASR systems. In practice, the matching of the resolutions may mean a 512-point FFT is utilized.

At block 204, a DUT spectral profile may be extracted from the DUT signal by the extracting unit 116. The DUT spectral profile may be calculated in the same manner as the reference spectral profile. At block 206, the reference spectral profile and the DUT spectral profile may be compared by the comparing unit 118.

At block 208, the delta between the reference spectral profile and the DUT spectral profile may be calculated by the delta calculating unit 120. The delta may be defined as:

$$D(f)=P_{REF}(f)/P_{DUT}(f)$$

where
f—frequency
$P_{REF}(f)$—reference spectral profile on linear scale
$P_{DUT}(f)$—DUT spectral profile on linear scale At block 210, D(f) may be used as a reference to design the correction filter. This may be accomplished by the design unit 122. For example, the correction filter may be designed using a frequency-sampling design method and implemented as a finite impulse response filter or the correction filter may be designed by any other suitable method. It may be possible to construct different correction filters for the different situations simulated during recording of the speech utterance by the DUT. For example, one recording may have occurred with the DUT in landscape mode and the speaker 3 feet away from the DUT at an angle of 45° to the DUT. In that case, $P_{DUT}(f)$ may be extracted from the recordings made for that particular set of circumstances. Hence, D(f) and the resulting correction filter may be specific to that situation.

At block 212, the correction filter may be applied to the signal produced by the microphone internal to the DUT. For example, the correction filter may be applied to the microphone's signal in real time by adding a filtering block to the pre-processing (up-link) pipeline. Pipelines of this type are often used for audio stacks in notebook computers, tablet computers, mobile phones, smart phones, and the like.

Application of the correction filter to the DUT's microphone signal may include determining the orientation of the DUT, the distance of a user from the DUT, the angle between the user and the DUT, and the position of the DUT's lid. These determinations may be made to ascertain which correction filter is appropriate given the set of circumstances. In this manner, the correction filter that is applied may be derived from the recordings made under the same or similar circumstances.

Blocks 202-210 may be referred to as the tuning stage and may be performed by the manufacturer of the DUT. Block 212 may be performed when a user speaks into the DUT's microphone.

Figure 3:
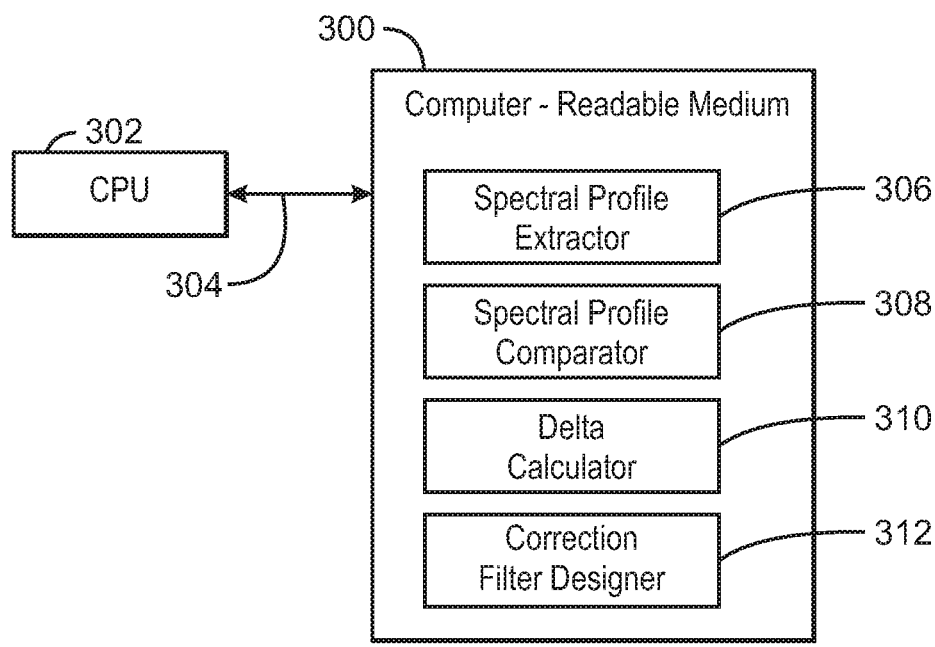
FIG. 3 is a block diagram showing a medium that contains logic for improving automatic speech recognition.

FIG. 3 is a block diagram showing a medium 300 that contains logic for obtaining a correction filter. The medium 300 may be a non-transitory computer-readable medium that stores code that can be accessed by a computer processing unit (CPU) 302 via a bus 304. For example, the computer-readable medium 300 can be a volatile or non-volatile data storage device. The medium 300 can also be a logic unit, such as an Application Specific Integrated Circuit (ASIC), a Field Programmable Gate Array (FPGA), or an arrangement of logic gates implemented in one or more integrated circuits, for example.

The medium 300 may include modules 306-312 configured to perform the techniques described herein. For example, a spectral profile extractor 306 may be configured to extract a reference spectral profile from a reference signal and a DUT spectral profile from a DUT signal. A spectral profile comparator 308 may be configured to compare the reference spectral profile and the DUT spectral profile. A delta calculator 310 may be configured to calculate a delta between the reference spectral profile and the DUT spectral profile. A correction filter designer 312 may be configured to design the correction filter using the computed delta. In some embodiments, the modules 306-312 may be modules of computer code configured to direct the operations of the processor 302.

The block diagram of FIG. 3 is not intended to indicate that the medium 300 is to include all of the components shown in FIG. 3. Further, the medium 300 may include any number of additional components not shown in FIG. 3, depending on the details of the specific implementation.

Figure 4A:
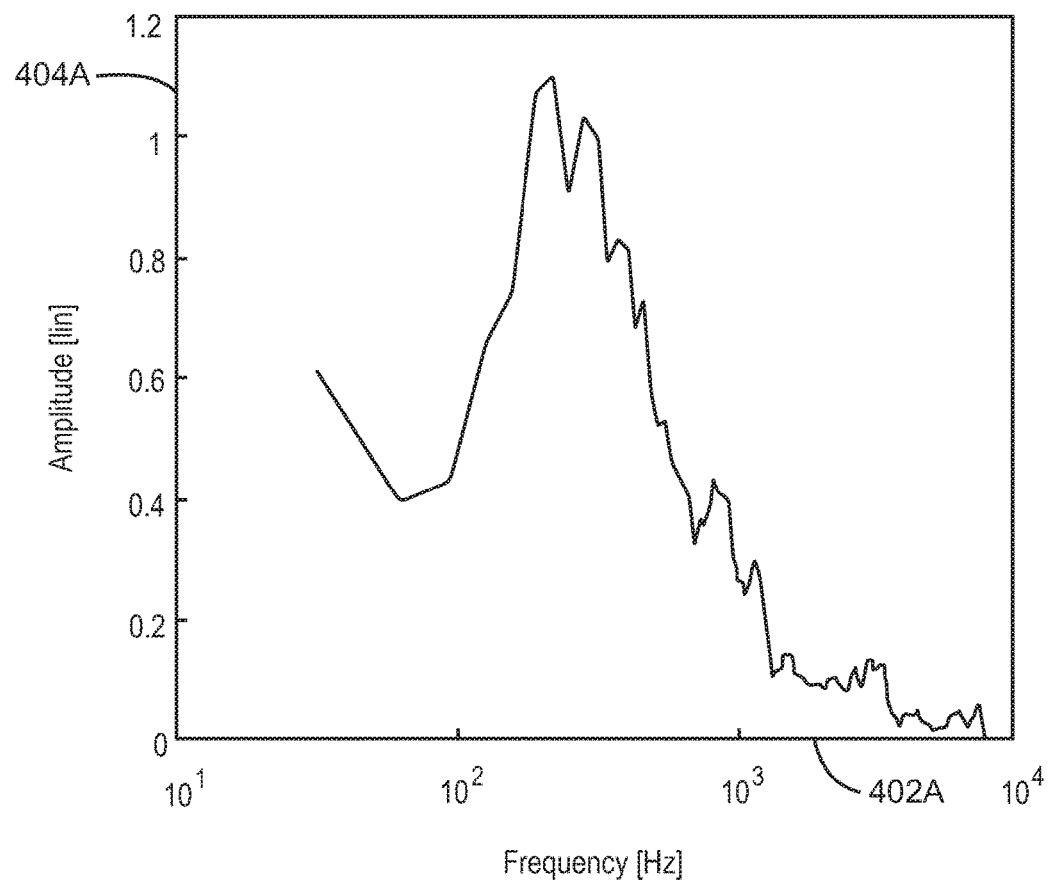
FIG. 4A is an example of a reference spectral profile obtained using the present techniques.
Figure 4B:
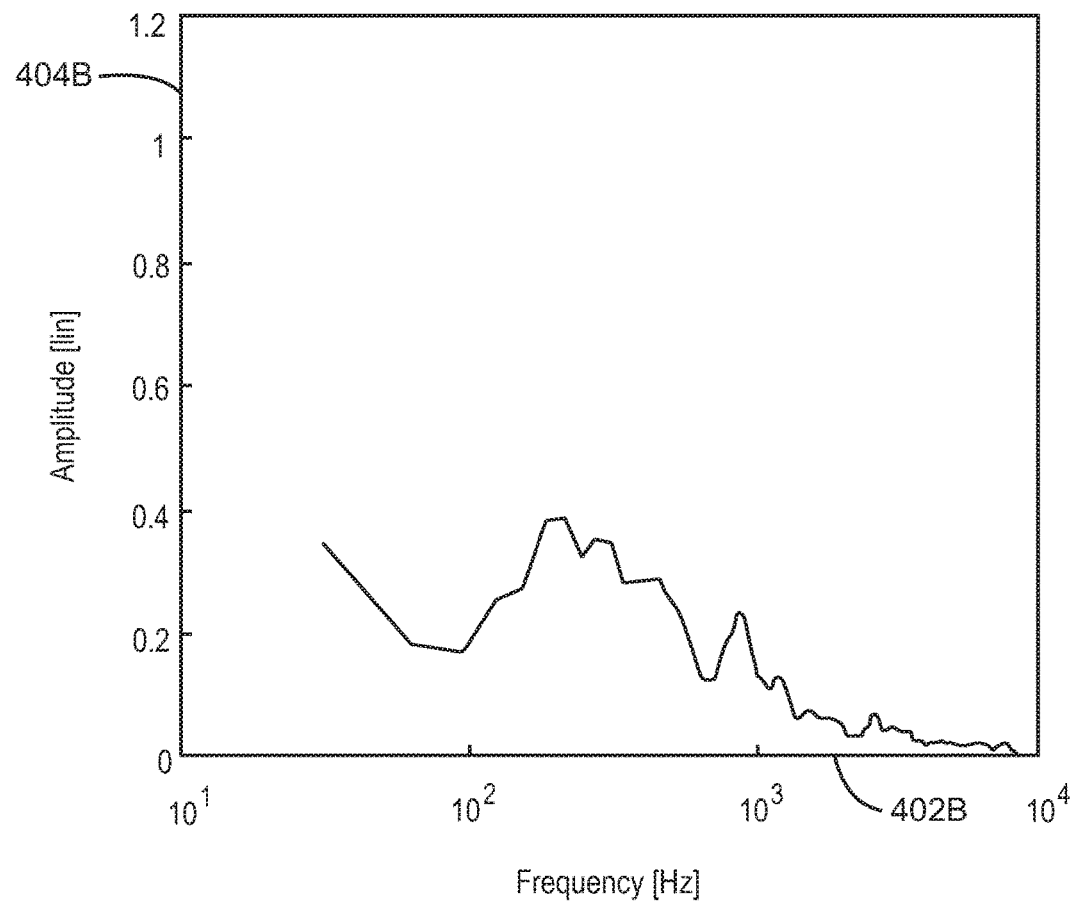
FIG. 4B is an example of a spectral profile for a device under test (DUT) obtained using the present techniques.
Figure 4C:
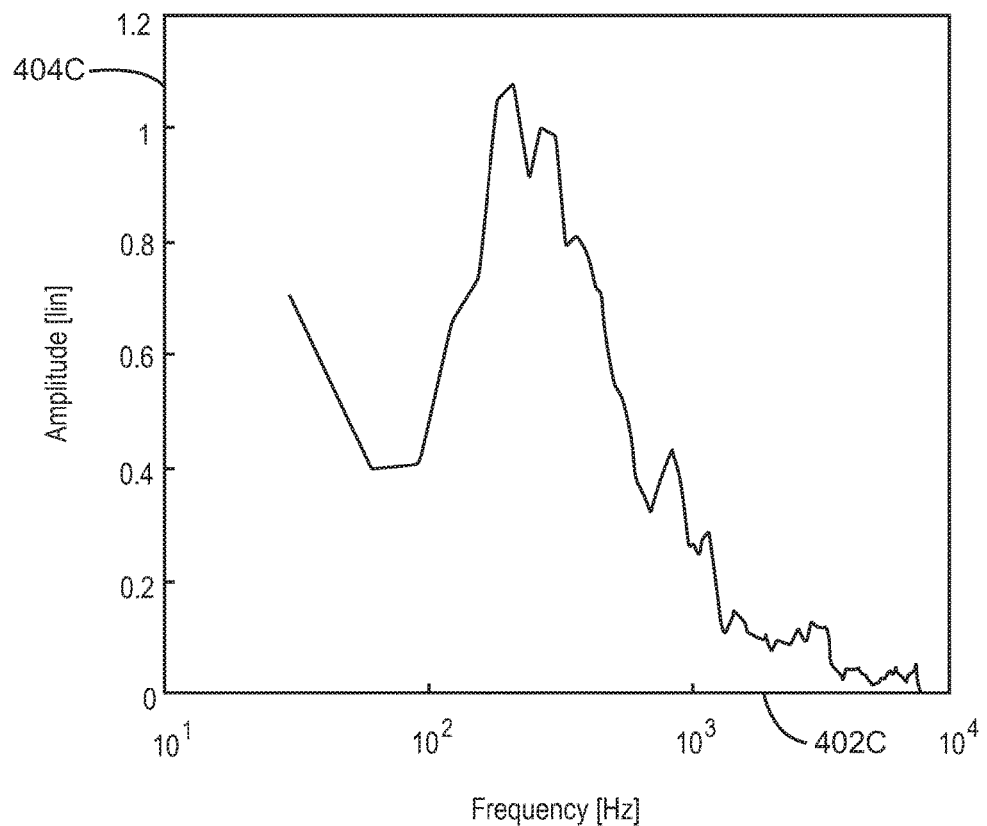
FIG. 4C is an example of a DUT spectral profile after application of a correction filter obtained using the present techniques.
Figure 4D:
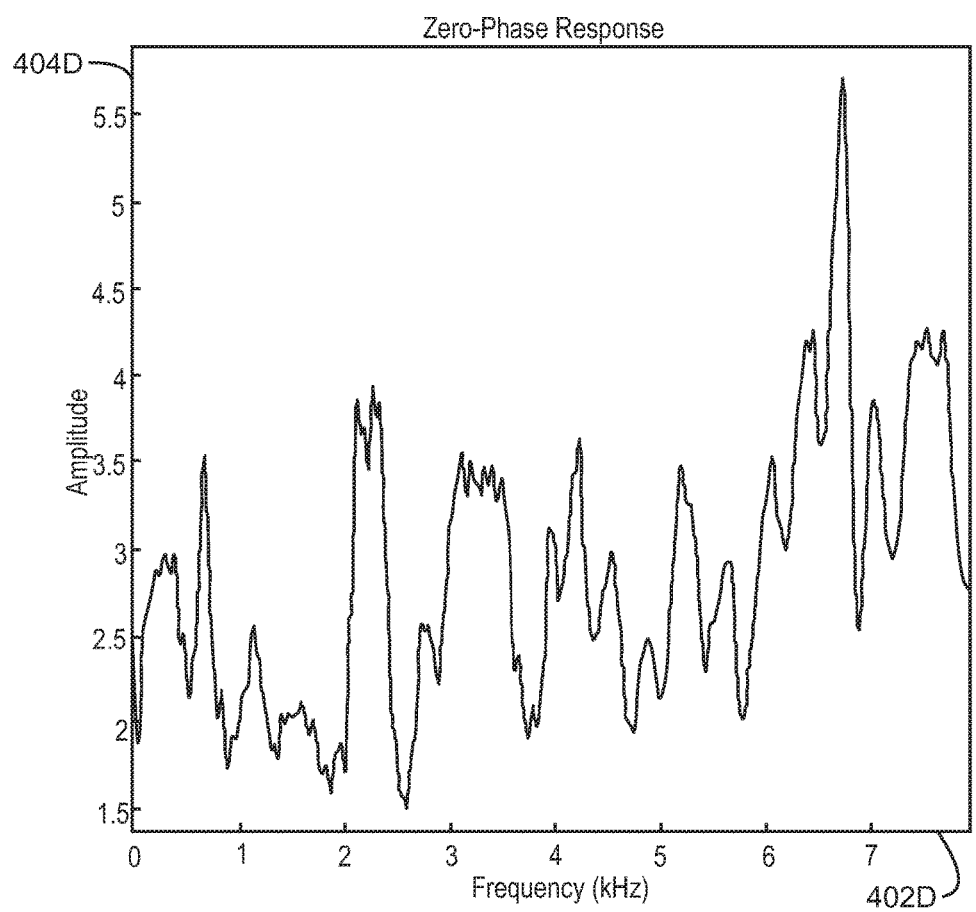
FIG. 4D is an example of a magnitude response of a correction filter obtained using the present techniques.

FIG. 4A is an example according to the present techniques. A notebook computer running an exemplary ASR engine was used to evaluate the accuracy of speech recognition. A set of high quality recordings was identified by their high ASR scores, i.e., low word error rates (WERs). The high quality recordings were used to compute the reference spectral profile shown in FIG. 4A. The DUT spectral profile is shown in FIG. 4B. FIG. 4C shows the DUT spectral profile after application of the correction filter. In FIGS. 4A-4C, the x-axes 402A, 402B, and 402C are frequency in Hertz and the y-axes 404A, 404B, and 404C are amplitude on a linear scale. FIG. 4D is the magnitude response of the correction filter calculated by techniques described herein. In FIG. 4D, the x-axis is frequency in Hertz and the y-axis is amplitude.

FIGS. 4E and 4F show the ASR accuracy improvements obtained when the correction filter was applied to speech signals. The speech signals were generated by broadcasting speech recordings over a main loudspeaker external to the DUT. The data shown in FIG. 4E was obtained in the absence of an additional loudspeaker. In contrast, FIG. 4F shows the results obtained in the presence of an additional side loudspeaker simulating a second user and masking the speech signals propagated by the main loudspeaker. The speech signals were obtained with the main loudspeaker positioned at different angles to the DUT. (At 00, the main loudspeaker is directly in front of the DUT.) In tables 400E and 400F, the angles are given in columns 402E and 402F. Scores are given as WERs 404E and 404F, thus lower values are better. Rows 406E and 406F give the WERs without the application of the correction filter. Rows 408E and 408F show the WERs with application of the correction filter designed by techniques described herein. Rows 410E and 410F give the delta values used to design the correction filter. Column 412E and 412F are the mean values for the rows 406E, 406F, 408E, 408F, 410E, and 410F.

Example 1 is an electronic device for improving speech recognition of a device under test (DUT). The electronic device includes an extracting unit to extract a reference spectral profile from a reference signal and a DUT spectral profile from a DUT signal; a comparing unit to compare the reference spectral profile and the DUT spectral profile; a delta calculating unit to compute a delta between the reference spectral profile and the DUT spectral profile to obtain a computed delta; and a design unit to design a correction filter based on the computed delta.

Example 2 includes the electronic device of example 1, including or excluding optional features. In this example, the electronic device includes a first calculating unit to calculate the reference signal from a set of recordings.

Example 3 includes the electronic device of any one of examples 1 to 2, including or excluding optional features. In this example, the design unit designs the correction filter using a plurality of recordings, and wherein the plurality of recordings are obtained from one or more devices.

Example 4 includes the electronic device of any one of examples 1 to 3, including or excluding optional features. In this example, the electronic device includes an application unit to apply the correction filter to a microphone of the DUT. Optionally, the electronic device includes an orientation sensor to determine an orientation of the DUT and employ an appropriate correction filter. Optionally, the electronic device includes a proximity sensor to determine a distance from a user to the DUT and employ the appropriate correction filter. Optionally, the electronic device includes an angle sensor to determine an angle between the user and the DUT and employ the appropriate correction filter. Optionally, the electronic device includes a lid position sensor to determine a position of a lid of the DUT and employ the appropriate correction filter.

Example 5 includes the electronic device of any one of examples 1 to 4, including or excluding optional features. In this example, the electronic device includes one or more microphones to receive the DUT signal. Optionally, the electronic device includes a recording unit to record the DUT signal.

Example 6 is a method of improving speech recognition of a device under test (DUT). The method includes extracting a reference spectral profile from a reference signal; extracting a DUT spectral profile from a DUT signal; comparing the reference spectral profile and DUT spectral profile; calculating a delta between the reference spectral profile and the DUT spectral profile; and designing a correction filter using the delta.

Example 7 includes the method of example 6, including or excluding optional features. In this example, the method includes using a set of speech recordings to calculate a reference signal. Optionally, the method includes averaging of amplitude spectra of the reference signal to obtain the reference spectral profile.

Example 8 includes the method of any one of examples 6 to 7, including or excluding optional features. In this example, the method includes recording a speech utterance using the DUT to obtain a recorded speech utterance. Optionally, the method includes broadcasting the recorded speech utterance using a speaker to obtain a broadcasted speech utterance; and receiving the broadcasted speech utterance using a microphone internal to the DUT to obtain a DUT signal. Optionally, broadcasting the recorded speech utterance comprises using a speaker external to the DUT. Optionally, broadcasting the recorded speech utterance comprises using a speaker internal to the DUT. Optionally, the method includes averaging of amplitude spectra of the DUT signal to obtain the DUT spectral profile.

Example 9 includes the method of any one of examples 6 to 8, including or excluding optional features. In this example, the method includes calculating the correction filter using a frequency-sampling method or any other technique for designing an audio signal filter.

Example 10 includes the method of any one of examples 6 to 9, including or excluding optional features. In this example, the method includes applying the correction filter to a signal produced by the microphone internal to the DUT. Optionally, applying the correction filter comprises determining at least one of an orientation of the DUT, a distance from a user to the DUT, an angle between the user and the DUT, and a position of a lid of the DUT.

Example 11 is a computer-readable medium, comprising instructions that, when executed by the processor, direct the processor to improve speech recognition of a device under test (DUT). The computer-readable medium includes instructions that direct the processor to extract a reference spectral profile from a reference signal; extract a DUT spectral profile from a DUT signal; compare the reference spectral profile and the DUT spectral profile; calculate a delta between the reference spectral profile and the DUT spectral profile; and design a correction filter using the delta.

Example 12 includes the computer-readable medium of example 11, including or excluding optional features. In this example, the computer-readable medium includes instructions to direct the processor to calculate the reference signal from a set of speech recordings. Optionally, the computer-readable medium includes instructions to direct the processor to average amplitude spectra of the reference signal to obtain the reference spectral profile.

Example 13 includes the computer-readable medium of any one of examples 11 to 12, including or excluding optional features. In this example, the computer-readable medium includes instructions to direct the processor to receive a speech utterance via a microphone to obtain the DUT signal. Optionally, the computer-readable medium includes instructions to direct the processor to average amplitude spectra of the DUT signal to obtain the DUT spectral profile.

Example 14 includes the computer-readable medium of any one of examples 11 to 13, including or excluding optional features. In this example, the computer-readable medium includes instructions to direct the processor to apply the correction filter to a signal produced by the microphone. Optionally, the computer-readable medium includes instructions to determine at least one of an orientation of the DUT, a distance from a user to the DUT, an angle between the user and the DUT, and a position of a lid of the DUT when applying the correction filter.

Example 15 includes the computer-readable medium of any one of examples 11 to 14, including or excluding optional features. In this example, the computer-readable medium includes instructions to calculate the correction filter using a frequency-sampling method or any other technique for designing an audio signal filter.

Example 16 is an apparatus for improving speech recognition of a device under test (DUT). The apparatus includes instructions that direct the processor to a means for extracting a spectral profile, wherein the means for extracting a spectral profile extracts a reference spectral profile from a reference signal and a DUT spectral profile from a DUT signal; a means for comparing the reference spectral profile and the DUT spectral profile; a means for calculating a delta between the reference spectral profile and the DUT spectral profile; and a means for designing a correction filter using the delta.

Example 17 includes the apparatus of example 16, including or excluding optional features. In this example, the apparatus includes a means for calculating the reference signal from a set of speech recordings.

Example 18 includes the apparatus of any one of examples 16 to 17, including or excluding optional features. In this example, the means for extracting a spectral profile averages amplitude spectra of the reference signal to obtain the reference spectral profile.

Example 19 includes the apparatus of any one of examples 16 to 18, including or excluding optional features. In this example, the apparatus includes a means for recording a speech utterance to obtain a recorded speech utterance. Optionally, the apparatus includes a means for broadcasting the recorded speech utterance to obtain a broadcasted speech utterance; and a means for receiving the broadcasted speech utterance to obtain a DUT signal. Optionally, the means for broadcasting the recorded speech utterance is a speaker external to the DUT. Optionally, the means for broadcasting the recorded speech utterance is a speaker internal to the DUT. Optionally, the means for receiving the broadcasted speech utterance is a microphone internal to the DUT.

Example 20 includes the apparatus of any one of examples 16 to 19, including or excluding optional features. In this example, the means for extracting a spectral profile averages amplitude spectra of the DUT signal to obtain the DUT spectral profile.

Example 21 includes the apparatus of any one of examples 16 to 20, including or excluding optional features. In this example, the apparatus includes a means for calculating the correction filter, wherein the means for calculating the correction filter is a frequency-sampling method or any other technique for designing an audio signal filter.

Example 22 includes the apparatus of any one of examples 16 to 21, including or excluding optional features. In this example, the apparatus includes a means for applying the correction filter to a signal produced by the microphone internal to the DUT. Optionally, the apparatus includes a means for applying the correction filter, wherein the means for applying the correction filter determines at least one of an orientation of the DUT, a distance from a user to the DUT, an angle between the user and the DUT, and a position of a lid of the DUT.

Example 23 is a notebook computer with improved speech recognition. The notebook computer with improved speech recognition includes instructions that direct the processor to an extracting unit to extract a reference spectral profile from a reference signal and a notebook computer spectral profile from a notebook computer signal; a comparing unit to compare the reference spectral profile and the notebook computer spectral profile; a delta calculating unit to compute a delta between the reference spectral profile and the notebook computer spectral profile to obtain a computed delta; and a design unit to design a correction filter based on the computed delta.

Example 24 includes the notebook computer with improved speech recognition of example 23, including or excluding optional features. In this example, the notebook computer with improved speech recognition includes a first calculating unit to calculate the reference signal from a set of recordings.

Example 25 includes the notebook computer with improved speech recognition of any one of examples 23 to 24, including or excluding optional features. In this example, the design unit designs the correction filter using a plurality of recordings, and wherein the plurality of recordings are obtained from one or more devices.

Example 26 includes the notebook computer with improved speech recognition of any one of examples 23 to 25, including or excluding optional features. In this example, the notebook computer with improved speech recognition includes an application unit to apply the correction filter to a microphone of the notebook computer. Optionally, the notebook computer with improved speech recognition includes an orientation sensor to determine an orientation of the notebook computer and employ an appropriate correction filter. Optionally, the notebook computer with improved speech recognition includes a proximity sensor to determine a distance from a user to the notebook computer and employ the appropriate correction filter. Optionally, the notebook computer with improved speech recognition includes an angle sensor to determine an angle between the user and the notebook computer and employ the appropriate correction filter. Optionally, the notebook computer with improved speech recognition includes a lid position sensor to determine a position of a lid of the notebook computer and employ the appropriate correction filter.

Example 27 includes the notebook computer with improved speech recognition of any one of examples 23 to 26, including or excluding optional features. In this example, the notebook computer with improved speech recognition includes one or more microphones to receive the notebook computer signal. Optionally, the notebook computer with improved speech recognition includes a recording unit to record the notebook computer signal.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the method or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An electronic device for improving speech recognition of a device under test (DUT), comprising:
   an extracting unit to extract a reference spectral profile from a reference signal and a DUT spectral profile from a DUT signal;
   a comparing unit to compare the reference spectral profile and the DUT spectral profile;
   a delta calculating unit to compute a delta between the reference spectral profile and the DUT spectral profile to obtain a computed delta;
   a design unit to design a correction filter based on the computed delta; and
   an application unit to apply the correction filter to a signal produced by a microphone internal to the DUT to improve speech recognition.

2. The electronic device of claim 1, comprising a first calculating unit to calculate the reference signal from a set of recordings.

3. The electronic device of claim 1, wherein the design unit designs the correction filter using a plurality of recordings, and wherein the plurality of recordings are obtained from one or more devices.

4. The electronic device of claim 1, comprising an orientation sensor to determine an orientation of the DUT and employ an appropriate correction filter.

5. The electronic device of claim 1, comprising a proximity sensor to determine a distance from a user to the DUT and employ the appropriate correction filter.

6. The electronic device of claim 1, comprising an angle sensor to determine an angle between the user and the DUT and employ the appropriate correction filter.

7. The electronic device of claim 1, comprising a lid position sensor to determine a position of a lid of the DUT and employ the appropriate correction filter.

8. The electronic device of claim 1, comprising one or more microphones to receive the DUT signal.

9. The electronic device of claim 8, comprising a recording unit to record the DUT signal.

10. A method, comprising:
    extracting a reference spectral profile from a reference signal;
    extracting a device-under-test (DUT) spectral profile from a DUT signal;
    comparing the reference spectral profile and DUT spectral profile;
    calculating a delta between the reference spectral profile and the DUT spectral profile;
    designing a correction filter using the delta; and
    applying the correction filter to a signal produced by a microphone internal to the DUT to improve speech recognition.

11. The method of claim 10, comprising using a set of speech recordings to calculate a reference signal.

12. The method of claim 11, comprising averaging of amplitude spectra of the reference signal to obtain the reference spectral profile.

13. The method of claim 10, comprising recording a speech utterance using the DUT to obtain a recorded speech utterance.

14. The method of claim 13, comprising:
    broadcasting the recorded speech utterance using a speaker to obtain a broadcasted speech utterance; and
    receiving the broadcasted speech utterance using a microphone internal to the DUT to obtain a DUT signal.

15. The method of claim 14, comprising averaging of amplitude spectra of the DUT signal to obtain the DUT spectral profile.

16. The method of claim 10, comprising calculating the correction filter using a frequency-sampling method or any other technique for designing an audio signal filter.

17. The method of claim 10, wherein applying the correction filter comprises determining at least one of an orientation of the DUT, a distance from a user to the DUT, an angle between the user and the DUT, and a position of a lid of the DUT.

18. At least one non-transitory computer-readable medium, comprising instructions to direct a processor to:
    extract a reference spectral profile from a reference signal;
    extract a device-under-test (DUT) spectral profile from a DUT signal;
    compare the reference spectral profile and the DUT spectral profile;
    calculate a delta between the reference spectral profile and the DUT spectral profile;
    design a correction filter using the delta; and
    apply the correction filter to a signal produced by a microphone internal to the DUT to improve speech recognition.

19. At least one non-transitory computer-readable medium of claim 18, comprising instructions to direct the processor to calculate the reference signal from a set of speech recordings.

20. At least one non-transitory computer-readable medium of claim 19, comprising instructions to direct the processor to average amplitude spectra of the reference signal to obtain the reference spectral profile.

21. At least one non-transitory computer-readable medium of claim 18, comprising instructions to direct the processor to receive a speech utterance via the microphone to obtain the DUT signal.

22. At least one non-transitory computer-readable medium of claim 21, comprising instructions to direct the processor to average amplitude spectra of the DUT signal to obtain the DUT spectral profile.

* * * * *